Figure 1:
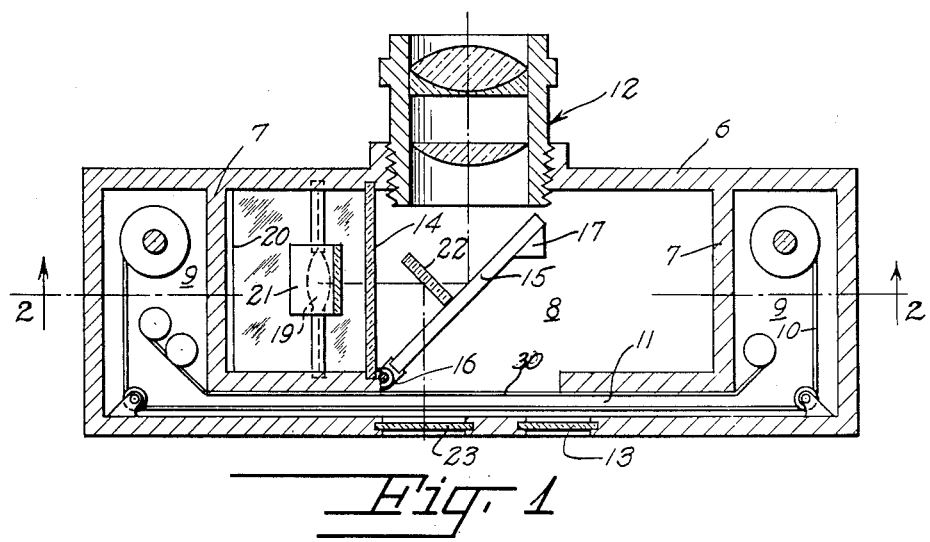

July 4, 1950     A. B. HARROTT     2,513,861
REFLEX CAMERA HAVING REFLECTING FINDER SYSTEM Filed April 29, 1947     2 Sheets-Sheet 1

Inventor
Alfred B. Harrott

By Morrow, Berman & Davidson
Attorneys

July 4, 1950     A. B. HARROTT     2,513,861
REFLEX CAMERA HAVING REFLECTING FINDER SYSTEM
Filed April 29, 1947     2 Sheets-Sheet 2

Inventor
Alfred B. Harrott

Patented July 4, 1950

2,513,861

UNITED STATES PATENT OFFICE 2,513,861

REFLEX CAMERA HAVING REFLECTING FINDER SYSTEM

Alfred B. Harrott, Rochester, N. Y.

Application April 29, 1947, Serial No. 744,671

1 Claim. (Cl. 95—42)

My invention relates to cameras, particularly to a focusing arrangement for use with a camera of the reflex type.

In the basic type of reflex camera, the objective lens projects an image upon a ground glass screen. In the older type of camera, the image was projected upon the vertical screen mounted directly behind the lens. In cameras of later design, variants are employed whereby a mirror inclined at an angle, generally 45 degrees, erects the image upon the glass screen, usually placed horizontally, and it is viewed from the top of the camera.

My device employs the conventional reflex method, using a swinging mirror and perpendicular ground glass screen to receive and reflect the image, but by a unique grouping of lens and mirrors, the image when refracted through the screen is picked up and reflected through a series of fixed mirrors, and may be viewed erect through an aperture in the back of the camera adjacent the conventional view finder.

It is an important object of my invention to provide a range finding device for a camera of the reflex type which will allow a magnified inspection of part or all of the image reflected on the ground glass screen from a position behind the camera.

It is another important object of my invention to provide a device of the character described having a focusing system in which only the lens and mirror on which the lens projects the image are movable.

It is a further object of the invention to provide a device of the character described in which either a combination of prisms or a system of fixed lens and mirrors may be used in association with a swinging mirror positioned in the exposure chamber of the camera to magnify and orient the image projected on said swinging mirror by the objective lens of the camera.

It is a still further object of my invention to provide a device of the character described in which the image refracted through the ground glass screen is quite brilliant, and after the refracted image is reflected it appears erect instead of laterally reversed, the said reflected image being observable through an aperture in the back of the camera.

It is another object of my invention to provide a device of the character described which will give a maximum of compactness and a minimum of trouble, and will permit focusing of the camera alongside the conventional eye-level viewing mechanism.

It is a still further object of my invention to provide a device of the character described which operates through the single objective lens of the camera, is itself an integral part of the camera, and permits focusing with an uncalibrated lens.

Other objects and advantages of the invention will become apparent during the course of the following specification, and accompanying drawings, forming part of the specification, in which like numerals are used to designate like parts throughout the specification and drawings.

Figure 2:
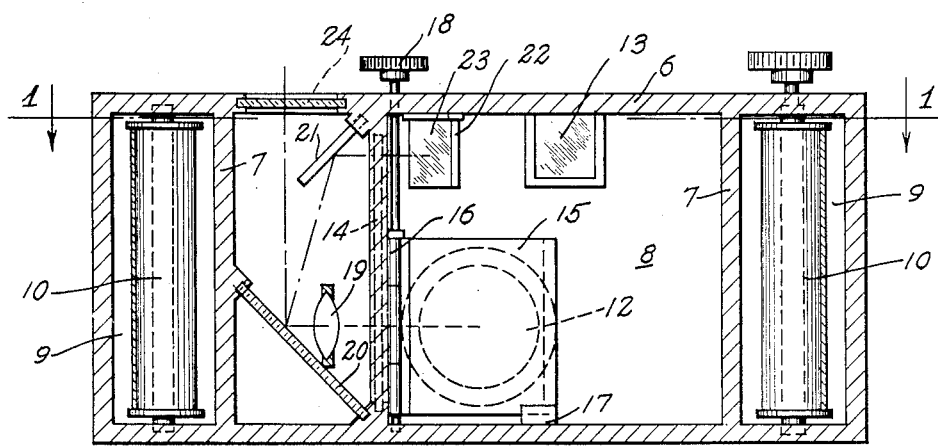
Figure 3:
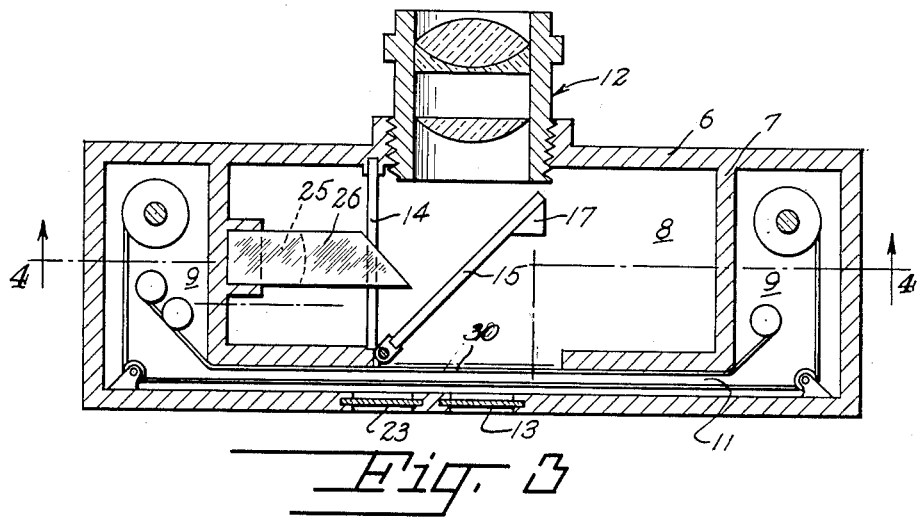
Figure 4:
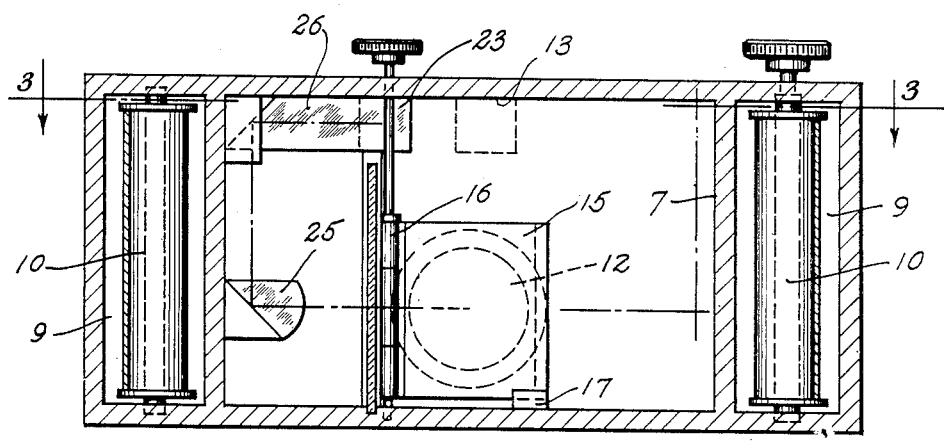

In the drawings:

Figure 1 is a plan view of the inside of a camera embodying my invention, taken substantially on the line 1—1 of Figure 2, Figure 2 is a sectional view of the same, taken substantially on the line 2—2 of Figure 1, Figure 3 is a view similar to Figure 1, prisms being substituted for the fixed lens and mirrors shown in Figure 1, taken on the line 3—3 of Figure 4, and Figure 4 is a sectional view of the same, taken substantially on the line 4—4 of Figure 3.

Referring now in detail to the drawings, particularly to Figures 1 and 2, the numeral 6 designates a camera arranged with interior partitions 7 dividing the interior of the body into an exposure chamber 8 and spaced apart film chambers 9 at the opposite ends of the said camera in which the respective spools of a roll film 10 are mounted, there being a communicating passage 11 therebetween through which the film 10 is drawn in the usual manner, for successive exposure of individual portions thereof to an objective lens 12, having means for focusing, mounted on the front of the camera in any conventional manner. The camera may also be provided with the usual view finder window 13 through which the scene to be photographed may be located, and the usual conventional curtain means 30 for cutting off light admitted into the exposure chamber when the lens is open for focusing the image on a screen, to prevent premature exposure of the said film. Since all of these features are old and well known in the art, and form no part of my invention, they need not be further described.

A perpendicular ground glass screen 14 is permanently mounted transversely of the camera body from the front interior wall thereof to a portion of the partition 7 defining the wall of the passage 11 and adjacent one side of the lens 12, and is adapted to receive an image reflected thereon by a mirror 15 to which the said image is projected by the lens 12. The mirror 15 is pivotally mounted, as at 16, for swinging motion relative to the said screen, there being a stop 17 to limit said motion outwardly from the said screen to an angle of 45 degrees carried on the floor of said exposure chamber. The said mirror 15 may be swung from and toward the said screen 14 by means of a knurled knob 18 associated with said pivot, or by any other convenient attachment.

The optical grouping of my focusing system comprises a converging lens 19 suitably mounted in any convenient manner adjacent the side of the screen 14 opposite the mirror 15 in the space defined by the said screen and the adjacent partition 7, and a plurality of fixed mirrors 20, 21, and 22, mounted as shown, to reflect the image refracted through the screen 14 a total of 180 degrees. The mirror 22 is mounted adjacent a focusing window 23 on the back of the camera, through which a clear view of the image refracted by the screen 14 may be viewed from outside the camera. I also provide a clear-glass covered opening 24 in the top of the camera through which a laterally reversed image may be seen when for any reason, such as taking "candid" shots, observation through the rear might be inconvenient.

To focus the camera, the mirror 15 is swung on its pivot until stopped by the stop member 17. The lens 12 is opened after the conventional curtain shutter components are closed to prevent the admitted light impinging upon the film in the exposure chamber and prematurely exposing it, and an image of the scene to be photographed is projected onto the mirror 15, and is reflected therefrom to the adjacent surface of the screen 14. The reflected image is then refracted through the said screen, to be picked up upon emergence through the opposite side of the screen by the convergent lens 19, mounted in the said exposure chamber adjacent the screen, as hereinbefore described. The image is inverted as it passes through the lens 19, the inverted image being picked up and reflected by the successive fixed mirrors 20, 21, and 22, until, when the said image reaches the mirror 22, visible from outside the camera, it is again erect, the image having been reflected a total of 180 degrees by the fixed mirrors. As pointed out, the image may also be observed from the top of the camera through the window 24. The camera may now be brought into an exact focus by the focusing mechanism associated with the lens 12 to show a sharp and distinct image. The lens is now closed, the shutter components opened, the mirror 15 swung on its pivot to clear the path between the lens 12 and the film 10, and the camera is ready to snap a clear and distinct picture of the scene.

Referring now to the embodiment of Figures 3 and 4, it will be noted that the structure of the camera, including the screen 14, the mirror 15, stop 17, means 30, and focusing window 23, is identical with the embodiment illustrated in Figures 1 and 2. The lens 19, the fixed mirrors 20, 21, and 22, and the opening 24 have been eliminated.

I have replaced the lens and fixed mirrors by a pair of prisms, including a lens-surfaced erecting prism 25 suitably mounted in the space between the screen 14 and the adjacent partition 7, arranged to pick up the image refracted through the said screen 14 as hereinbefore explained, the said image now being reflected through the prism 25 without distortion, to be picked up after passing therethrough by a pencil type prism 26 mounted in the camera adjacent and visible through the focusing window 23. The erect image as reflected through the prism 26 may be observed through the said window 23. Focusing is carried out thereafter in the manner already described.

It will be noted that sight lines showing the transmission of the image by lens and mirrors, and by the prisms, respectively, are clearly shown in the respective figures.

I have described my invention in the forms best known to me at this time. It is to be understood, however, that changes in the shape and arrangement of the parts may be made within the scope of the subjoined claim without departing from the spirit of the invention.

Having thus described the invention, I claim:

A reflex type camera, comprising a rectangular casing including front and rear sides, ends, a top and bottom, vertically-disposed L-shaped partitions secured to the front side and extending near the rear side and inwardly of the ends forming an inner rectangular exposure chamber, end film chambers and a longitudinal film passage, an adjustable objective lens mounted upon the front side near its longitudinal center and near the bottom, a 45 degree vertical mirror arranged within the exposure chamber rearwardly of the objective lens and near the bottom, the mirror being pivotally connected at its near vertical edge to the top and bottom of the casing, a rod secured to the mirror and extending rotatably through the top of the casing for turning the mirror, a vertically disposed ground glass screen disposed within the exposure chamber and secured to the front side and one L-shaped partition and spaced laterally of the objective lens, a converging lens spaced laterally outwardly of the screen near the bottom and secured to the front side and said L-shaped partition, a 45 degree inclined mirror plate disposed laterally outwardly of the converging lens and secured to the bottom and to said partition, a second 45 degree inclined mirror arranged above the last-named inclined mirror plate and objective lens and secured to the top of the casing at its top edge only, a second 45 degree vertical mirror plate secured to the top of the casing at its top edge only and arranged above and at right angles to the first-named vertical mirror, and a window in the rear side near the top and in alignment with the last-named mirror.

ALFRED B. HARROTT.

REFERENCES CITED

The following references are of record in the file of this patent:

UNITED STATES PATENTS

| Number | Name | Date |
|---|---|---|
| 1,484,584 | Tauen | Feb. 19, 1924 |
| 2,057,198 | Marcussen | Oct. 13, 1936 |
| 2,256,517 | Cohen | Sept. 23, 1941 |
| 2,284,562 | Dittman | May 26, 1942 |
| 2,442,327 | Soreny | May 25, 1948 |

FOREIGN PATENTS

| Number | Country | Date |
|---|---|---|
| 489,125 | Great Britain | July 20, 1938 |

OTHER REFERENCES

Ser. No. 304,702, Kuppenbender, (A. P. C.), published May 4, 1943 (abandoned).